US009524087B2

(12) United States Patent
Mahoney et al.

(10) Patent No.: US 9,524,087 B2
(45) Date of Patent: *Dec. 20, 2016

(54) IMAGING PRODUCT SELECTION METHOD

(75) Inventors: Kathleen A. Mahoney, Spencerport, NY (US); Ronald S. Cok, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 13/112,024

(22) Filed: May 20, 2011

(65) Prior Publication Data

US 2012/0297301 A1    Nov. 22, 2012

(51) Int. Cl.
*G06F 3/0484* (2013.01)
*G06T 11/60* (2006.01)

(52) U.S. Cl.
CPC ........... *G06F 3/04842* (2013.01); *G06T 11/60* (2013.01); *G06F 2203/04803* (2013.01)

(58) Field of Classification Search
CPC ............... G06F 2203/04806; G06F 3/0236; G06F 3/04842; G06F 2203/04803; G06T 2200/32; G06T 2200/24; G06T 11/60
USPC ....... 715/716, 730, 766, 767, 790, 796, 802, 715/823, 859
See application file for complete search history.

(56) References Cited

U.S. PATENT DOCUMENTS

| | | | | |
|---|---|---|---|---|
| 6,915,489 | B2* | 7/2005 | Gargi | 715/790 |
| 7,203,380 | B2* | 4/2007 | Chiu et al. | 382/284 |
| 7,536,654 | B2* | 5/2009 | Anthony et al. | 715/838 |
| 7,555,718 | B2* | 6/2009 | Girgensohn et al. | 715/723 |
| 7,576,755 | B2* | 8/2009 | Sun et al. | 345/629 |
| 7,600,191 | B2* | 10/2009 | Yoshikawa et al. | 715/790 |
| 7,739,617 | B2* | 6/2010 | Ording et al. | 715/790 |
| 7,810,039 | B2* | 10/2010 | Yamamoto et al. | 715/765 |
| 7,904,455 | B2* | 3/2011 | Chiu et al. | 707/737 |
| 7,904,797 | B2* | 3/2011 | Wong et al. | 715/200 |
| 8,381,135 | B2* | 2/2013 | Hotelling et al. | 715/863 |
| 8,543,940 | B2* | 9/2013 | Singhal et al. | 715/809 |
| 2002/0033848 | A1* | 3/2002 | Sciammarella et al. | 345/838 |
| 2008/0072154 | A1* | 3/2008 | Michaelis et al. | 715/727 |
| 2009/0003712 | A1* | 1/2009 | Mei et al. | 382/225 |
| 2009/0316989 | A1* | 12/2009 | Barbieri et al. | 382/173 |
| 2010/0164986 | A1* | 7/2010 | Wei et al. | 345/619 |
| 2010/0185965 | A1* | 7/2010 | Davidson et al. | 715/765 |
| 2010/0287493 | A1* | 11/2010 | Majumder et al. | 715/788 |
| 2011/0145753 | A1* | 6/2011 | Prakash | 715/783 |
| 2012/0246565 | A1* | 9/2012 | Kumamoto | 715/273 |

OTHER PUBLICATIONS

Christel et al., "Collages as Dynamic Summaries for News Video", Multimedia '02, Dec. 1-6, 2002, Juan-les-Pins, France, copyright 2002 ACM, pp. 561-569.*

* cited by examiner

*Primary Examiner* — Andrew Tank
(74) *Attorney, Agent, or Firm* — Hogan Lovells US LLP

(57) ABSTRACT

A method for displaying a collage of digital images on a display, receiving a selection for one of the digital images to be presented on a separate area of the display together with any associated multimedia, wherein one of the digital images has a portion overlapped by another digital image.

12 Claims, 7 Drawing Sheets

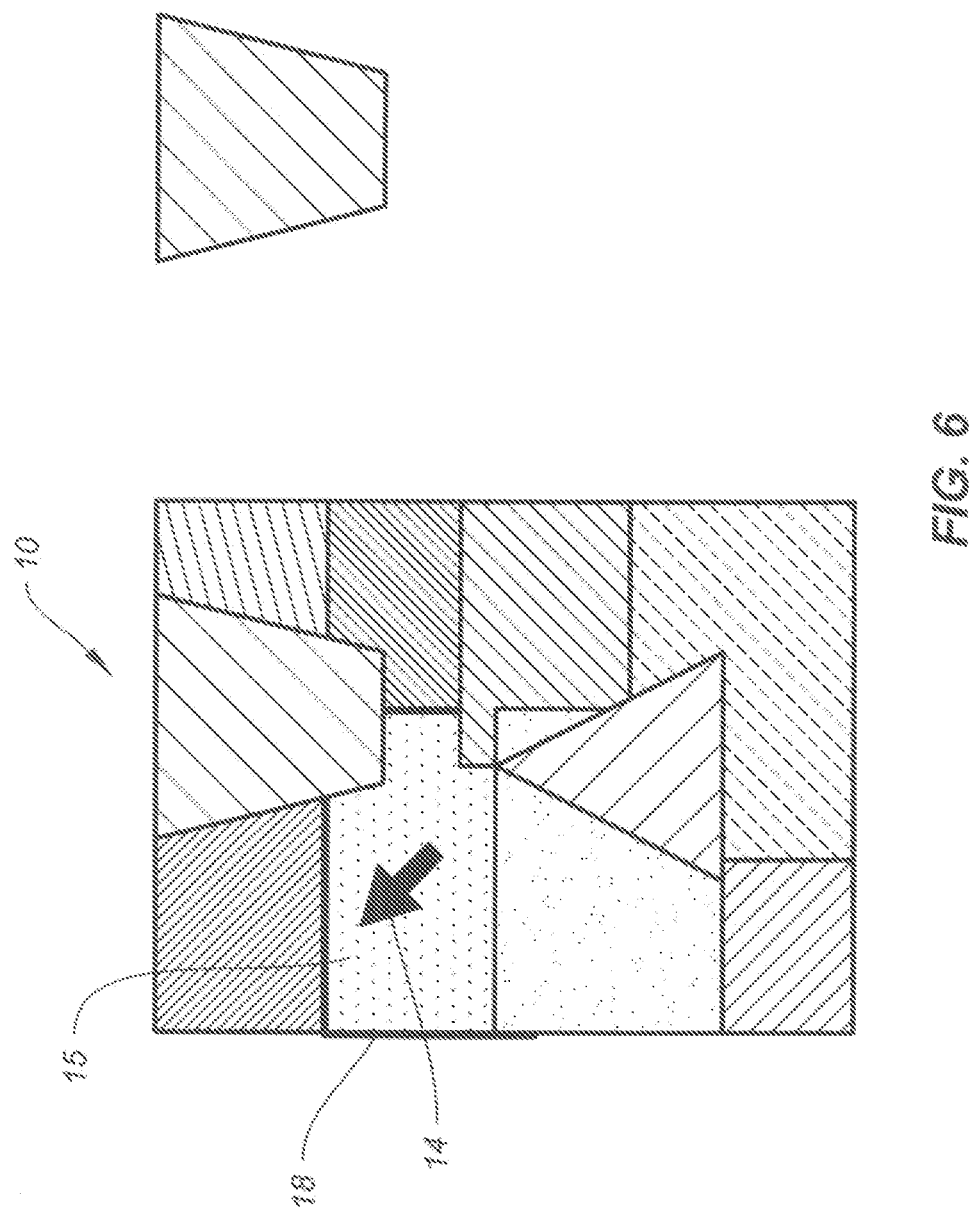

IMAGING PRODUCT SELECTION METHOD

CROSS REFERENCE TO RELATED APPLICATION

Reference is made to commonly assigned, co-pending U.S. patent application Ser. No. 13/112,017 by Mahoney et al. filed of even date herewith entitled "Imaging Product Selection System", the disclosure of which is incorporated herein in its entirety.

FIELD OF THE INVENTION

The present invention relates to displaying multi-media elements having images in a photo-collage arrangement of a computer graphic user interface.

BACKGROUND

Products that include images are a popular keepsake or gift for many people. Such products typically include a picture taken by an individual that is inserted into a product intended to enhance the product, the presentation of the image, or to provide storage for the image. Examples of such products include picture albums, photo-collages, posters, picture calendars, picture mugs, picture ornaments, picture mouse pads, and picture post cards.

Images can also be combined with other images, for example templates including background images and one or more image openings into which an individual's image can be inserted, either mechanically or electronically with a computer, to form a combined image that displays the individual's image in a pleasing or preferred manner. These image products can be provided in hard-copy form, for example as a printed photo-book, or in electronic form presented by a computer, for example in an on-line album. Imaging products can also include multi-media products, especially when in electronic form, that, for example, can include motion image sequences or audio tracks.

Users who make image-based products usually desire to share the products with others. Such sharing can take the form of printed products or electronic versions of the products, for example by displaying the products on a computer screen. Obviously, some image products are not readily amenable to an electronic experience, for example image-enhanced mugs or mouse pads are best enjoyed as physical products, while other image products can be enjoyed electronically, for example photobooks, greeting cards, and photo-collages.

Photo-collages provide a means for presenting a larger number of images in a limited space by emphasizing the most important portions of the images and providing an interesting, artistic, or amusing image presentation. A photo-collage as known in the prior art is illustrated in FIG. 2. In FIG. 2, a photo-collage 10 includes a plurality of images 11. The textured patterns within the illustrated borders represent separate images. At least one image overlaps another image 11 so that the visible portion of the overlapped image 11 is cropped. Some images can have portions that are apparently hidden behind other images. Other images 11A can be apparently in front of the other images, but cropped. Other images can be completely visible and not cropped.

Photo-collages have been traditionally made by physically cutting up printed photographs and adhering them to a surface and by physically overlapping one printed photograph over another. When reproduced, a photo-collage takes on the appearance of FIG. 2. The advent of "what-you-see-is-what-you-get" representative graphic user interfaces and electronic image processing software on computers has enabled the design and layout of electronic photo-collages. Such software enables a user to specify and arrange a number of images in a collage. Images can be located over other images to obscure portions of the image and can be moved forward and backward with other images in a virtual stack by arranging objects using commands such as "Bring to Front" or "Send to Back". These photo-collages can be rendered as a single, large image and printed, emailed, or viewed electronically. However, image products such as photo-collages that can be enjoyed electronically, for example with a computer, can have a limited experience and do not always take advantage of all of the capabilities of the computer. Moreover, in order for a user to view the obscured portions of images in a photo-collage, the original electronic image processing software must be available to the user and the user must specifically re-arrange the photo-collage elements. There is a need therefore, for an improved method for interacting on a computer with image products.

SUMMARY OF THE INVENTION

In accordance with the present invention, there is provided a method of displaying images in a multi-media display apparatus, comprising the steps of providing a display having a graphic user interface (GUI) and a user-interactive GUI pointing device. A plurality of multi-media image elements is displayed, one or more of the images overlapping one another so that only a portion of an overlapped image is visible. A selection from a pointing device in association with one of the displayed images modifies the display of the selected image to show the entire associated image so that it is not overlapped by any other. The image can be modified to display the entire selected image.

Another preferred embodiment of the present invention comprises a method of displaying a collage of digital multimedia elements on a display, receiving a selection for one of the multimedia elements to be presented on the display, wherein the multimedia element has a portion overlapped by another one of the multimedia elements, and presenting the selected multimedia element on the display with no portion of it overlapped. The step of presenting can include the step of presenting the selected multimedia element in a display area separated from the collage. The step of presenting can include the step of playing an audio track associated with the multimedia element. It can also include playing a video on the display if the multimedia element is a video.

Another preferred embodiment of the present invention includes a method comprising displaying a collage of digital images on a display, receiving a selection for one of the digital images to be presented on a separate area of the display together with any associated multimedia, wherein one of the digital images has a portion overlapped by another digital image. The selected one of the digital images is displayed on the separate area of the display together with said any associated multimedia. The associated multimedia includes an audio track.

The present invention has the advantage of enhancing the utility and enjoyment of a photo-collage and increasing the value of the photo-collage. These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. For example, the summary descriptions above are not meant to describe individual separate embodiments whose elements are not interchangeable. In fact, many of the elements described as related to a particular embodiment can be used together with, and possibly interchanged with, elements of other described embodiments. Many changes and modifications may be made within the scope of the present invention without departing from the spirit thereof, and the invention includes all such modifications. The figures below are intended to be drawn neither to any precise scale with respect to relative size, angular relationship, or relative position nor to any combinational relationship with respect to interchangeability, substitution, or representation of an actual implementation.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 6 illustrates a high-lighted image within a photo-collage presentation according to an embodiment of the present invention;

DETAILED DESCRIPTION OF THE INVENTION

According to the present invention, an image product is a product that includes images incorporated into an image-related object, such as for example a photo-book, a picture greeting card, a photo-collage, a picture mug, or other image-related product. The images can be a user's personal images and the image product can be personalized. The images can be located in specified pre-determined locations or can be adaptively located according to the sizes, aspect ratios, orientations and other attributes of the images. Likewise, the image sizes, orientations, or aspect ratios included in the image product can be adjusted, either to accommodate pre-defined templates with specific pre-determined openings or adaptively adjusted for inclusion in an image product.

Figure 2:
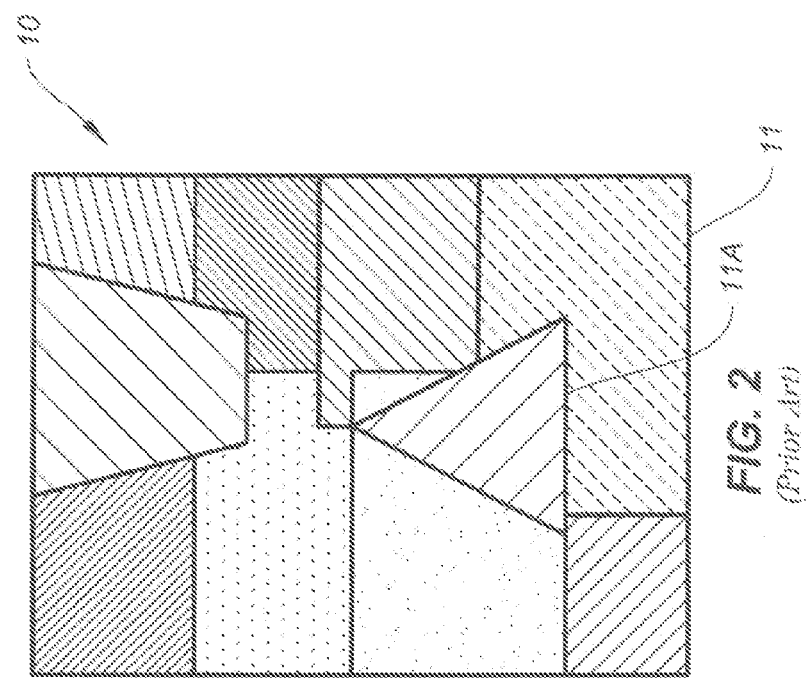
FIG. 2 is a prior-art illustration of a photo-collage.

As used herein, a photo-collage is an image product that includes a plurality of multi-media elements. The multi-media elements can include, for example, still images, video images, still images with associated audio components, and videos with associated audio components, but must include at least one image. For clarity of communication herein, still images will be referred to and illustrated in the Figures, but the present invention is not limited to only single, still images. The image(s) in a photo-collage are combined on a single surface or area and at least some of the images overlap other images so that the visible portion of the overlapped images in the photo-collage is less than the entire overlapped image. Thus, a portion of the overlapped image is hidden behind other images. FIG. 2 illustrates a prior-art photo-collage.

Figure 1:
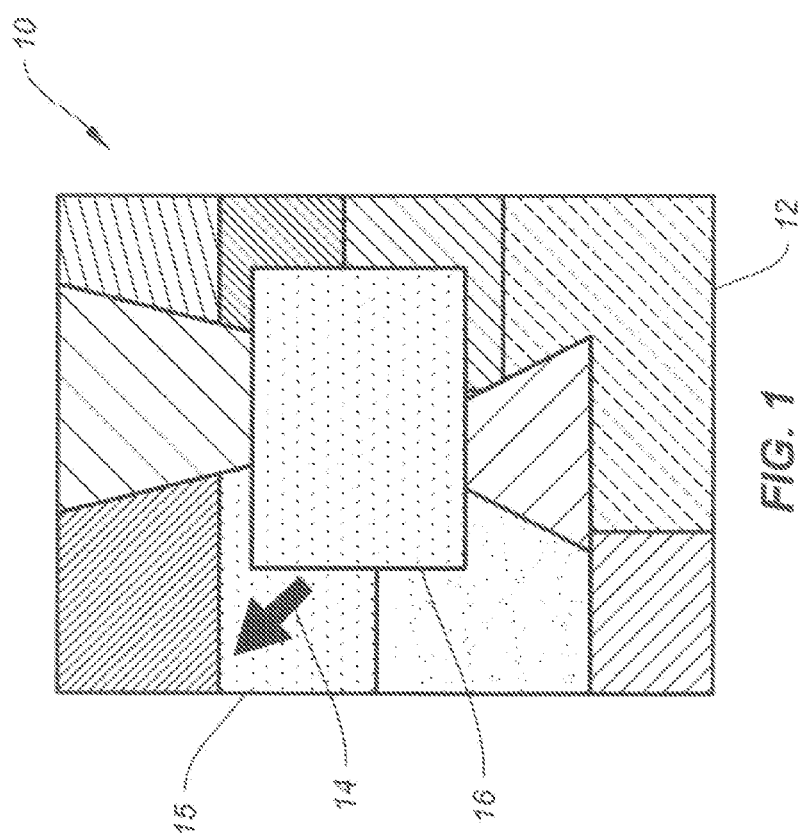
FIG. 1 illustrates a photo-collage presentation according to an embodiment of the present invention.

An electronic photo-collage, according to various embodiments of the present invention, can include multi-media elements in addition to one or more images. Furthermore, by interacting electronically with a photo-collage rendered in a graphic user interface, a greater variety of media can be experienced by a viewer and the hidden portions of image elements can be viewed. Referring to FIG. 1, a photo-collage 10 includes a plurality of multi-media elements 12, each multi-media element includes at least one image, but each multi-media element can also include a plurality of images, video, motion images, and audio elements. A multi-media element 15, when selected by a viewer, is brought into the foreground and presented to a viewer as a complete multi-media element 16 so that no portion of the selected multi-media element is obscured by any other multi-media element. This presentation can include displaying a still image in the foreground, with or without an associated audio track, and motion images, or videos, with or without an associated audio track. An alternative presentation method includes presenting a selected multimedia element in a full screen mode that occupies the entire display. Deselecting the multi-media element or selecting another multi-media element will cause the previously selected multi-media element to terminate its foreground display position, or its multimedia playback, and to return to its original position in the collage, which may or may not be overlapped by another multi-media element. The presentation of the complete multi-media element can also include displaying an entire still image, displaying a video sequence, displaying a motion sequence, displaying a slide show of ordered still images, and playing an audio sequence, tone, or music. By presenting a complete multi-media element to a user, the utility and enjoyment of the photo-collage is enhanced and the value of the photo-collage increased.

Figure 3:
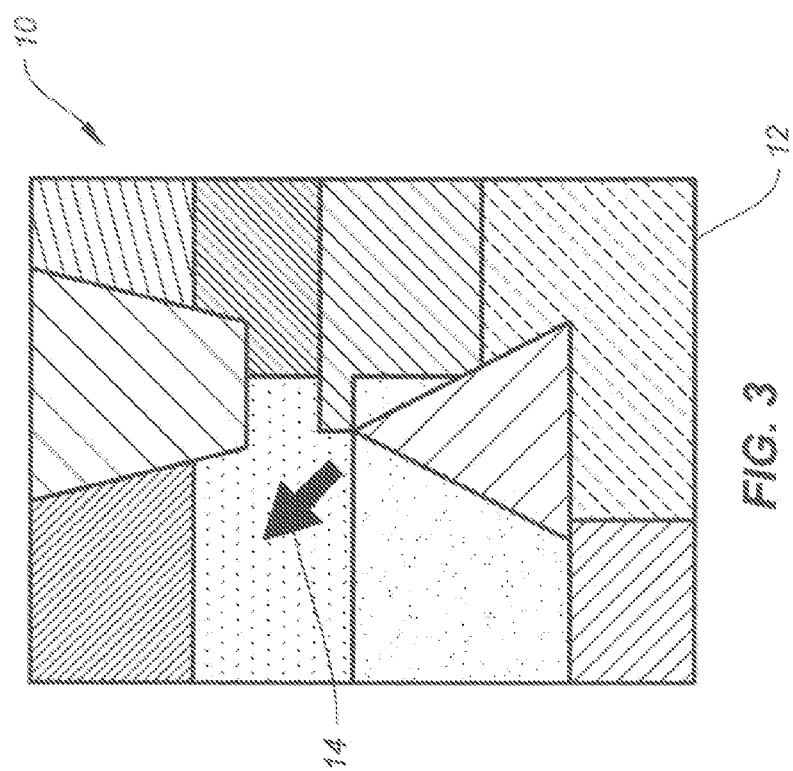
FIG. 3 illustrates a photo-collage presentation with a graphic user interface pointer.

The selection of the presented multi-media element can be made in a graphic user interface with a pointing device, such as a mouse, trackball, or touchpad having an associated pointing indicator, or pointer 14. Other means of indicating elements within a graphic user interface can also be employed and are included in the present invention. Selection of a multi-media element can be made by locating the pointer 14 in association with a multi-media element, such as an image, for example by locating the pointer 14 over the image, as illustrated in FIG. 3. Operating switches on a control (e.g. clicking with a mouse) can also be used to select an image or multi-media element as can the sequential selection of images, for example by repeatedly pressing a key, such as a tab or directional key such as an arrow key.

Presentation of the selected multi-media element can be initiated in a variety of ways according to various embodiments of the present invention. For example, a presentation can be activated when the pointer is located in association with an image, or when a control is first pressed (e.g. pressing and releasing a button on a mouse while the pointer is located over an image), or as long as the control is pressed (e.g. pressing and holding a button on a mouse while the pointer is located over an image). By moving the pointer, presentation of other multi-media elements can be activated and begin its display with or without video or audio playback. Other techniques are known in the art for selecting and controlling elements in a graphic interface and for controlling presentation of multi-media, for example through graphic windows.

According to one embodiment, the method of the present invention can be implemented in a multi-media display system that includes a processor, a display, and a memory storing a program, the electronic photo-collage, and the multi-media elements making up the electronic photo-collage. The program controls the display and the memory to display the photo-collage in an area on the display, and tracks the position of the pointer in the display. The position of the pointer in the display is compared to the area in which the electronic photo-collage is displayed. When the pointer position corresponds to any portion of the displayed area of the electronic photo-collage, the pointer position is compared to the positions of the various multi-media elements of the photo-collage. The multi-media element corresponding to the pointer position is determined, for example by employing a map of the photo-collage having a reference to the corresponding multi-media element at each location in the photo-collage. Once the multi-media element located by the pointer is determined, the multi-media element can be played back. Alternatively, an additional selection step (e.g. a control such as a mouse button is activated) can be employed. The selected multi-media element is played back by identifying the type of multi-media element (e.g. a still photograph or video sequence having a type-dependent file suffix) and executing a program to play the multi-media element.

Figure 4:
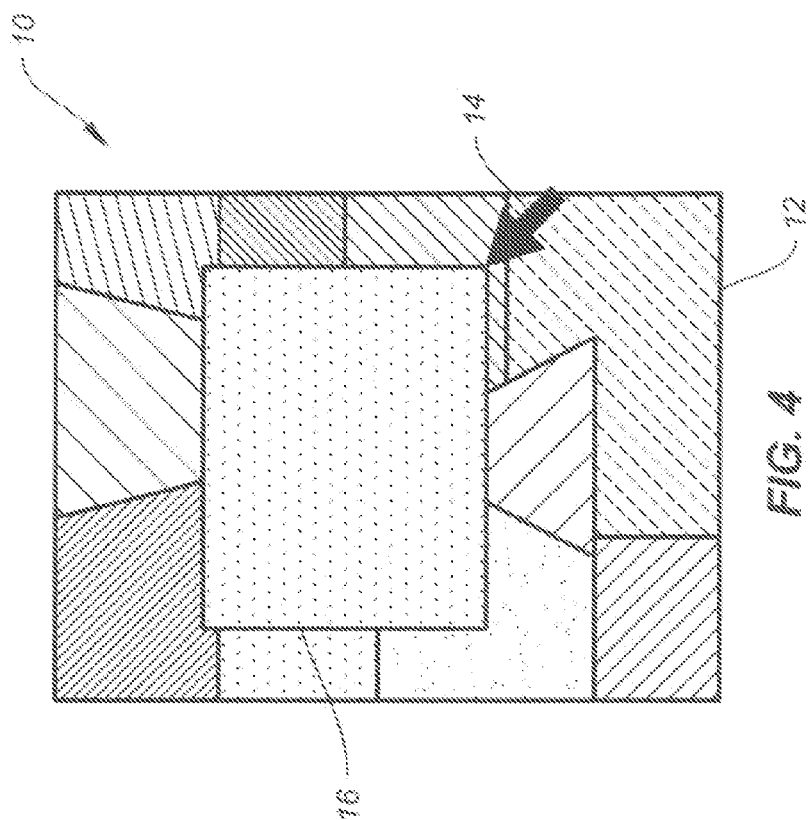
FIG. 4 illustrates a photo-collage presentation according to an embodiment of the present invention.

The presentation of the multi-media element can be made over the photo-collage, obscuring elements of the photo-collage while the presentation is made, as shown in FIG. 4. The presentation of the visual elements (e.g. images) can be made larger or at a higher resolution than the display of the portion of the image in the photo-collage, as is also shown in FIG. 4. Presentation of the visual elements can be at the location of the overlapped image in the photo-collage or at the center of the photo-collage.

Figure 5C:
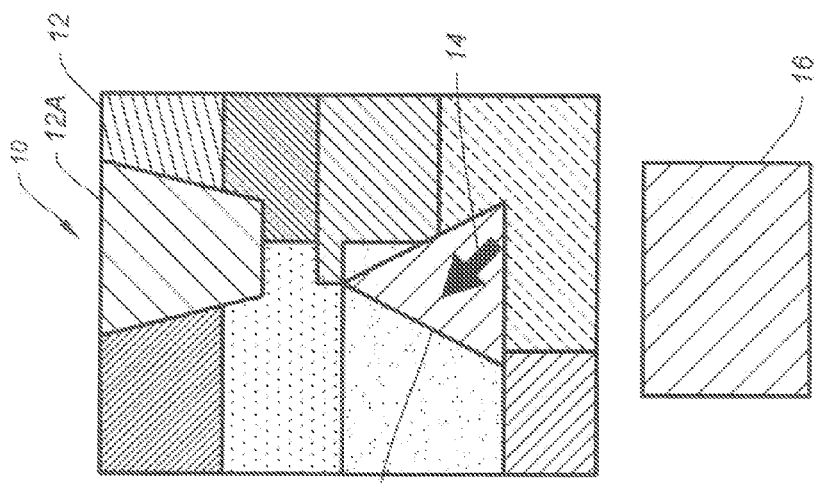
FIGS. 5A-5C illustrate photo-collage presentations according to an embodiment of the present invention.
Figure 5B:
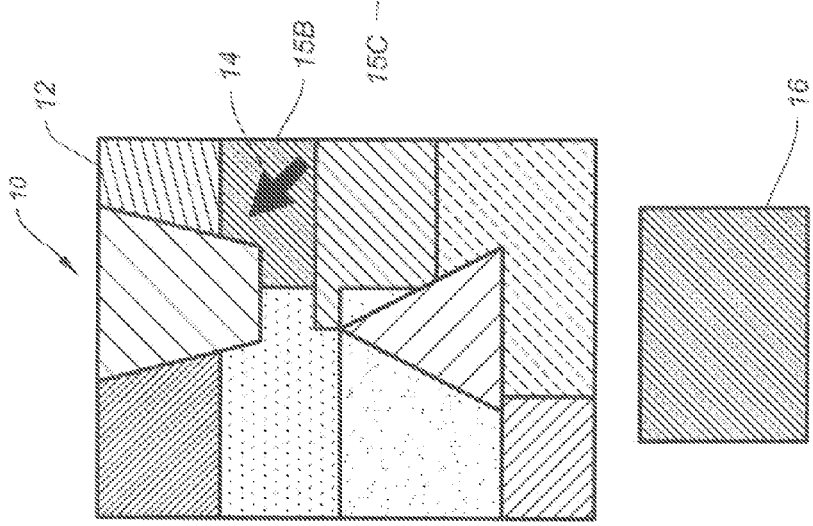
Figure 5A:
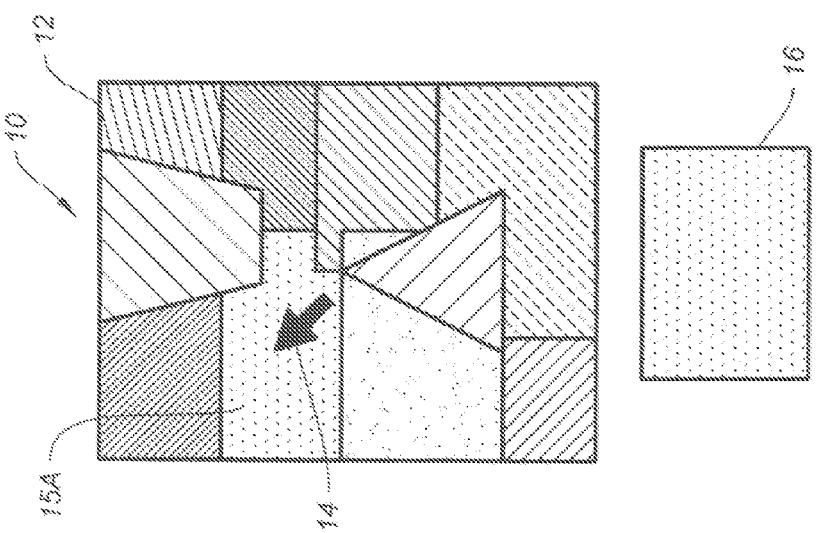

Alternatively, the presentation of the selected multi-media element can be made in a different location separate from the photo-collage, as is shown in FIGS. 5A-5C. Referring to FIG. 5A, pointer 14 indicates selected multi-media element 15A in photo-collage 10 having multi-media elements with images 12. The selected multi-media element 15A is presented as a complete multi-media element 16, so that the entire image or images of multi-media element 15A are presented to a viewer without being obscured or cropped by other images. Referring to FIG. 5B, pointer 14 is in a different location and indicates a different selected multi-media element 15B in photo-collage 10 having images 12. The selected multi-media element 15B is presented as a complete multi-media element 16, so that the entire image or images of multi-media element 15B are presented to a viewer without being obscured or cropped by other images. Referring to FIG. 5C, pointer 14 is in yet a different location and indicates yet a different selected multi-media element 15C in photo-collage 10 having images 12. The selected multi-media element 15C is presented as a complete multi-media element 16, so that the entire image or images of multi-media element 15C are presented to a viewer without being obscured or cropped by other images. In this case, the image of selected multi-media element 15C is not obscured by other images, but the image is cropped within the photo-collage 10. The images of other multi-media elements that are not obscured, overlapped, or cropped could also be included in the photo-collage and presented. The shapes of such images are not necessarily distinguished from overlapped or obscured images; such images might actually have the shapes shown in the photo-collage although they are not overlapped or obscured. For example, the image of multi-media element 12A can actually be shaped as an inverted trapezoid without being overlapped, as shown, so that selecting the image does not present any additional image content, as shown in FIG. 6, for example, which illustrates a presentation of selected multimedia element 12A. However, if there are other media associated with multi-media element 12A, they can also be presented.

The present invention can be implemented using a variety of computers and computer systems illustrated in FIGS. 7 and 8 and discussed further below. In one embodiment, for example, a desktop or laptop computer executing a software application can provide a multi-media display apparatus suitable for presenting multi-media photo-collage elements as described above. In such an embodiment, a multi-media display apparatus comprises: a display having a graphic user interface (GUI) including a user-interactive GUI pointing device; a plurality of multi-media elements displayed on the GUI, one or more of the displayed multi-media elements of the plurality of multi-media elements apparently overlapping another of the plurality of multi-media elements so that only a portion of the overlapped multi-media elements is visible; and a computer executing software for controlling the display of each multi-media elements displayed on the GUI so that when the pointing device is located in association with a selected one of the displayed overlapped multi-media elements, the display of the multi-media elements is automatically modified to display and play back the entire selected multi-media element in such a way that it is not overlapped by any other of the plurality of multi-media elements and so that when the pointing device is removed from association with the selected overlapped multi-media elements, the play back of the multi-media element is stopped and the display of the multi-media elements is automatically returned to its previous arrangement, to be apparently overlapped by another of the plurality of multi-media elements so that only a portion of the selected overlapped multi-media elements is visible.

In another embodiment, a computer server can provide web pages that are served over a network to a remote client computer. The web pages can allow a user of the remote client computer to design and construct a multi-media element photo-collage. Applications provided by the web server to a remote client can enable presentation of selected multi-media elements, either as stand-alone software tools or provided through html, Java, or other known-internet interactive tools. In this embodiment, a multi-media display system comprises: a server computer providing graphical user interface display elements and functions to a remote client computer connected to the server computer through a computer network, the remote client computer including a display having a graphic user interface (GUI) including a user-interactive GUI pointing device; a plurality of multi-media elements stored on the server computer, communicated to the remote client computer, and displayed on the GUI, one or more of the displayed multi-media elements of the plurality of multi-media elements apparently overlapping another of the plurality of multi-media elements so that only a portion of the overlapped multi-media elements is visible; and a tool for controlling the display of each multi-media elements displayed on the GUI so that when the pointing device is located in association with a selected one of the displayed overlapped multi-media elements, the display of the multi-media elements is modified to display and play back the entire selected multi-media element in such a way that it is not overlapped by any other of the plurality of multi-media elements and so that when the pointing device is removed from association with the selected overlapped multi-media elements, the play back of the multi-media element is stopped and the display of the multi-media elements is modified to be apparently overlapped by another of the plurality of multi-media elements so that only a portion of the selected overlapped multi-media elements is visible.

Computers and computer systems are stored program machines that execute software programs to implement desired functions. According to an embodiment of the present invention, a software program executing on a computer with a display and graphic user interface (GUI) including a user-interactive GUI pointing device comprises: software for displaying a plurality of multi-media elements having images on the GUI, one or more of the displayed images apparently overlapping another of the displayed images so that only a portion of the one or more images is visible; software for locating the pointing device in association with one of the displayed images; and software for modifying the display of the image to display the entire overlapped image so that it is no longer overlapped by any other of the plurality of images.

In any of these embodiments, the multi-media element can be a still image, a graphical element, or a video image sequence, and can include an audio element and wherein the display interface includes means for playing the audio element when the pointing device is located in association with the selected overlapped multi-media element.

In one embodiment of the present invention, the entire selected multi-media element is displayed in front of other overlapped images at the same location as the associated image so that the entire selected multi-media element obscures other overlapped images at the same location as the selected image. In an alternative embodiment, the entire associated multi-media element is displayed in a different location than the associated image.

The multi-media element can be modified when displayed, for example by increasing the size or resolution of the multi-media element image or image series to display a larger view of the image.

The plurality of multi-media elements can form a page of images, for example in a photo-collage arrangement.

The present invention includes a variety of graphic user interface techniques for selecting a multi-media element image. For example, a pointing device can be located in association with one of the plurality of multi-media elements by locating the pointing device over an image. Control elements or indicators such as switches or buttons can be used together with a pointer and controlled by a variety of user interface devices such as are known in the user interface arts, e.g. mouse, trackball, and touch pad devices.

Referring to FIG. 6, in one embodiment of the present invention, a selected multi-media element 15 can be highlighted within a photo-collage 10 to indicate the selection, for example a highlighted image 18 can be highlighted by a bold border (as shown), or by inverting the colors (not shown) or other visual or auditory indicia. These kinds of indicia can also be used to indicate that a collage element includes an associated audio or video presentation format. For example, the collage element can be a still image extracted from an associated video presentation in .MOV format.

Figure 7:
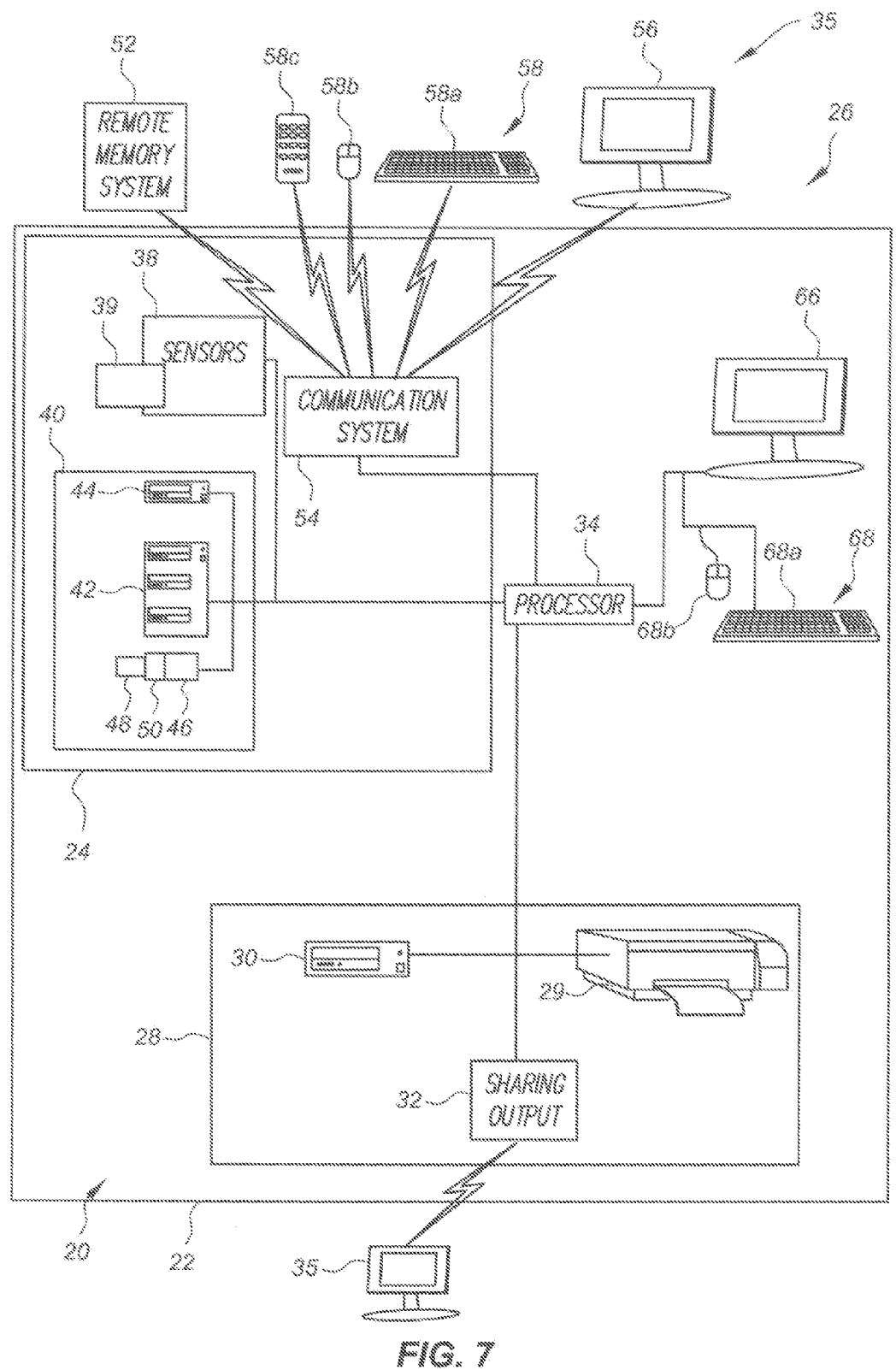
FIG. 7 is a schematic of a computer system useful for the present invention.
Figure 8:
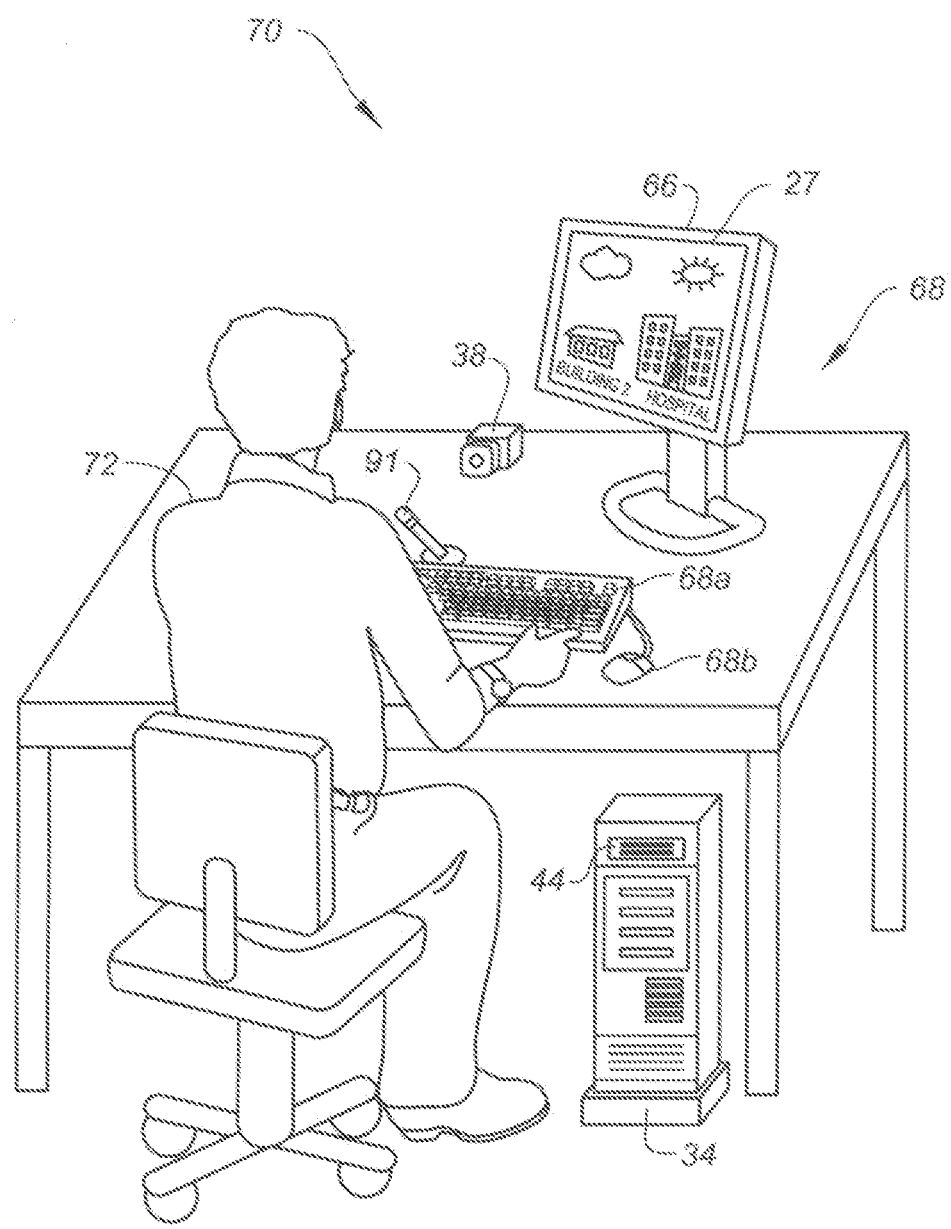
FIG. 8 is schematic of a computer system useful for the present invention.

Referring to FIGS. 7 and 8, computers, computer servers, and a communication system are illustrated together with various elements and components that are useful in accordance with various embodiment of the present invention. FIG. 7 illustrates a first embodiment of an electronic system 20 that can be used in generating an image product. In the embodiment of FIG. 7, electronic system 20 comprises a housing 22 and a source of content data files 24, a user input system 26 and an output system 28 connected to a processor 34. The source of content data files 24, user-input system 26 or output system 28 and processor 34 can be located within housing 22 as illustrated. In other embodiments, circuits and systems of the source of content data files 24, user input system 26 or output system 28 can be located in whole or in part outside of housing 22.

The source of content data files 24 can include any form of electronic or other circuit or system that can supply digital data to processor 34 from which processor 34 can derive images for use in forming an image-enhanced item. In this regard, the content data files can comprise, for example and without limitation, still images, image sequences, video graphics, and computer-generated images. Source of content data files 24 can optionally capture images to create content data for use in content data files by use of capture devices located at, or connected to, electronic system 20 and/or can obtain content data files that have been prepared by or using other devices. In the embodiment of FIG. 7, source of content data files 24 includes sensors 38, a memory 40 and a communication system 54.

Sensors 38 are optional and can include light sensors, biometric sensors and other sensors known in the art that can be used to detect conditions in the environment of system 20 and to convert this information into a form that can be used by processor 34 of system 20. Sensors 38 can also include one or more video sensors 39 that are adapted to capture images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 can be fixed within system 20 or it can be removable. In the embodiment of FIG. 7, system 20 is shown having a hard drive 42, a disk drive 44 for a removable disk such as an optical, magnetic or other disk memory (not shown) and a memory card slot 46 that holds a removable memory 48 such as a removable memory card has a removable memory interface 50 for communicating with removable memory 48. Data including, but not limited to, control programs, digital images and metadata can also be stored in a remote memory system 52 such as a personal computer, computer network or other digital system. Remote memory system 52 can also include solid-state, magnetic, optical or other data-storage devices.

In the embodiment shown in FIG. 7, system 20 has a communication system 54 that in this embodiment can be used to communicate with an optional remote memory system 52, an optional remote display 56, and/or optional remote input 58. The optional remote memory system 52, optional remote display 56, optional remote input 58A can all be part of a remote system 21 having an input station 58 having remote input controls 58 (also referred to herein as "remote input 58"), can include a remote display 56, and that can communicate with communication system 54 wirelessly as illustrated or can communicate in a wired fashion. In an alternative embodiment, a local input station including either or both of a local display 66 and local input controls 68 (also referred to herein as "local user input 68") can be connected to communication system 54 using a wired or wireless connection.

Communication system 54 can comprise for example, one or more optical, radio frequency or other transducer circuits or other systems that convert image and other data into a form that can be conveyed to a remote device such as remote memory system 52 or remote display 56 using an optical signal, radio frequency signal or other form of signal. Communication system 54 can also be used to receive a digital image and other data from a host or server computer or network (not shown), a remote memory system 52 or a remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the interne, a cellular, peer-to-peer or other form of mobile telecommunication network, a local communication network such as wired or wireless local area network or any other conventional wired or wireless data transfer system. In one useful embodiment, the system 20 can provide web access services to remotely connected computer systems (e.g. remote systems 35) that access the system 20 through a web browser. Alternatively, remote system 35 can provide web services to system 20 depending on the configurations of the systems.

User input system 26 provides a way for a user of system 20 to provide instructions to processor 34. This allows such a user to make a designation of content data files to be used in generating an image-enhanced output product and to select an output form for the output product. User input system 26 can also be used for a variety of other purposes including, but not limited to, allowing a user to arrange, organize and edit content data files to be incorporated into the image-enhanced output product, to provide information about the user or audience, to provide annotation data such as voice and text data, to identify characters in the content data files, and to perform such other interactions with system 20 as will be described later.

In this regard user input system 26 can comprise any form of transducer or other device capable of receiving an input from a user and converting this input into a form that can be used by processor 34. For example, user input system 26 can comprise a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 6, user input system 26 includes an optional remote input 58 including a remote keyboard 58a, a remote mouse 58b, and a remote control 58c and a local input 68 including a local keyboard 68a and a local mouse 68b.

Remote input 58 can take a variety of forms, including, but not limited to, the remote keyboard 58a, remote mouse 58b or remote control handheld device 58c illustrated in FIG. 7. Similarly, local input 68 can take a variety of forms. In the embodiment of FIG. 7, local display 66 and local user input 68 are shown directly connected to processor 34.

As is illustrated in FIG. 8, local user input 68 can take the form of a home computer, an editing studio, or kiosk 70 (hereafter also referred to as an "editing area 70") that can also be a remote system 35 or system 20. In this illustration, a user 72 is seated before a console comprising local keyboard 68a and mouse 68b and a local display 66 which is capable, for example, of displaying multimedia content.

As is also illustrated in FIG. 8, editing area 70 can also have sensors 38 including, but not limited to, video sensors 39, audio sensors 74 and other sensors such as multispectral sensors that can monitor user 72 during a production session.

Output system 28 is used for rendering images, text or other graphical representations in a manner that allows image-product designs to be combines with user items and converted into an image product. In this regard, output system 28 can comprise any conventional structure or system that is known for printing or recording images, including, but not limited to, printer 29. Printer 29 can record images on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as being of a type that generates color images. However, it will be appreciated that this is not necessary and that the claimed methods and apparatuses herein can be practiced with a printer 29 that prints monotone images such as black and white, grayscale, or sepia toned images. As will be readily understood by those skilled in the art, a system 35, 20 with which a user interacts to define a user-personalized image product can be separated from a remote system (e.g. 35, 20) connected to a printer, so that the specification of the image product is remote from its production.

In certain embodiments, the source of content data files 24, user input system 26 and output system 28 can share components.

Processor 34 operates system 20 based upon signals from user input system 26, sensors 38, memory 40 and communication system 54.

Processor 34 can include, but is not limited to, a programmable digital computer, a programmable microprocessor, a programmable logic processor, a series of electronic circuits, a series of electronic circuits reduced to the form of an integrated circuit, or a series of discrete components. The system 20 of FIGS. 7 and 8 can be employed to make and display an image product according to an embodiment of the present invention.

Figure 9:
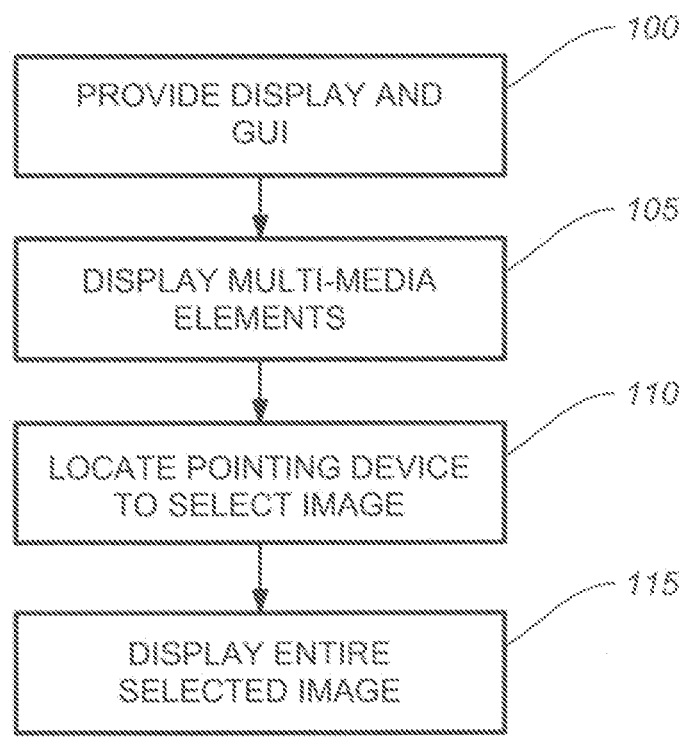
FIG. 9 is a flow chart illustrating a method according to an embodiment of the present invention.

Referring to FIG. 9, in a method of the present invention, a personalized image product can be made by providing a graphic user interface including a user-interactive GUI pointing device (GUI) on a computer for displaying images and image products in step 100. For example, the systems 20 and 35 of FIGS. 7 and 8 can provide such a graphic user interface 27 illustrated in FIG. 8 on local display 66. Such systems are known in the computing arts. In step 105, a plurality of multi-media elements having images are displayed on the GUI. One or more of the displayed images of the plurality of multi-media elements apparently overlap another so that only a portion of the overlapped image is visible. In step 110, the pointing device is located in association with one of the displayed images to select the displayed image. In step 115, the entire selected image is displayed so that it is not overlapped by any other of displayed images.

In various embodiments, the method of the present invention can include the step of modifying the display of the entire selected image to display a larger and complete view of the entire selected image. The images associated with the multi-media elements can be displayed in the form of a photo-collage and can be rendered and displayed onto a single page. When the selected image is modified to display the entire image, it can obscure other images in the photo-collage.

Images can be selected by associating the pointing device with the image by locating the pointing device over the associated image in the graphic user interface.

The invention has been described in detail with particular reference to certain preferred embodiments thereof, but it will be understood that variations and modifications can be effected within the spirit and scope of the invention.

PARTS LIST 10 photo-collage
11 image
11A image
12 multi-media element, image
12A multi-media element, image
14 pointer
15 selected multi-media element
15A selected multi-media element
15B selected multi-media element
15C selected multi-media element
16 complete multi-media element
18 highlight image
20 system
22 housing
24 source of content data files
26 user input system
27 graphic user interface
28 output system
29 printer
30 tangible surface
34 processor
35 remote system
38 sensors
39 video sensors
40 memory
42 hard drive
44 disk drive
46 memory card slot
48 removable memory
50 memory interface
52 remote memory system
54 communication system
56 remote display
58 remote input
58a remote keyboard
58b remote mouse
58c remote control
66 local display
68 local input
68a local keyboard
68b local mouse
70 home computer, editing studio, or kiosk
72 user
74 audio sensors
100 provide display and GUI step
105 display multi-media elements step
110 locate pointing device to select image step
115 display entire selected image step

The invention claimed is:

1. A method of emphasizing and displaying images in a multi-media display apparatus, comprising:
   providing a display having a graphic user interface (GUI) including a user-interactive GUI pointing device;
   displaying a plurality of multi-media elements on the GUI in the form of a customizable photo-collage, wherein one or more of the displayed multi-media elements appears to overlap another one or more displayed multi-media elements so that only portions of the overlapped multi-media elements appear visible;
   receiving one or more user preferences related to the shapes and sizes associated with the photo-collage and adaptively locating the plurality of multi-media elements within the photo-collage according to the one or more user preferences and according to visual attributes of the multi-media elements;
   receiving a selection from a pointing device, said selection comprising a single user action, in association with one of the displayed images to select the associated displayed image;
   in response to said selection from a pointing device, modifying the display of the selected image to display the entire selected image in a different location separate from the photo-collage so that it is not overlapped by any other of the displayed images, the selected image comprising a non-rectangular shape when displayed in the different location; and
   in response to said selection from a pointing device, modifying the display of the entire selected image to display a larger view of the entire selected image without enlarging other images.

2. The method of claim 1 further comprising the step of displaying the plurality of multi-media elements in the form of a rectangular photo-collage.

3. The method of claim 1 further comprising the step of displaying the plurality of multi-media elements as a page.

4. The method of claim 1 further comprising the step of locating the pointing device in association with one of the multi-media elements by locating the pointing device over the multi-media element.

5. The method of claim 1 further comprising the step of providing the pointing device as a mouse cursor.

6. The method of claim 1, wherein one or more of the digital multimedia elements includes an audio track.

7. The method of claim 1 further comprising the step of providing the pointing device as a touch screen.

8. A method of emphasizing and displaying multi-media elements in a display apparatus, comprising:
   receiving one or more user preferences related to the shapes and sizes associated with a collage and adaptively locating a plurality of digital multimedia elements within the collage according to the one or more user preferences and according to visual attributes of the digital multimedia elements;
   displaying the collage on a display such that a portion of one or more of the digital multimedia elements is overlapped by another one or more of the digital multimedia elements;
   receiving a selection for one of the digital multimedia elements to be presented on the display, said selection comprising a single user action;
   in response to said selection, presenting the selected one of the digital multimedia elements in a different location separate from the collage on the display such that no portion of the selected digital multimedia element is overlapped, the selected digital multimedia element comprising a non-rectangular shape when presented in the different location; and
   in response to said selection, modifying the display of the digital multi-media element to display a larger view of the digital multi-media element without enlarging other digital multi-media elements.

9. The method of claim 8, wherein the step of presenting includes the step of playing an audio track associated with the selected one of the digital multimedia elements.

10. The method of claim 9, wherein the selected one of the digital multimedia elements comprises a video and the step of presenting includes playing the video on the display.

11. The method of claim 8, wherein the step of displaying the collage includes the step of displaying indicia indicating which ones of the digital multimedia elements include an audio track for presentation.

12. The method of claim 8, wherein the step of displaying the collage includes the step of displaying indicia indicating which ones of the digital multimedia elements include a video for presentation.

* * * * *